(12) United States Patent
Ozawa et al.

(10) Patent No.: US 8,642,705 B2
(45) Date of Patent: *Feb. 4, 2014

(54) CONJUGATED DIENE POLYMER, PROCESS FOR ITS PRODUCTION AND RUBBER COMPOSITIONS CONTAINING THE SAME

(75) Inventors: Youichi Ozawa, Tokyo (JP); Hajime Kondou, Tokyo (JP); Noriko Endou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,889

(22) Filed: Jul. 2, 2010

(65) Prior Publication Data

US 2010/0280173 A1 Nov. 4, 2010

Related U.S. Application Data

(63) Continuation of application No. 10/496,983, filed as application No. PCT/JP02/12390 on Nov. 27, 2002, now Pat. No. 7,781,533.

(30) Foreign Application Priority Data

Nov. 27, 2001 (JP) ................................ 2001-361354

(51) Int. Cl.
| | | |
|---|---|---|
| C08C 19/20 | (2006.01) | |
| C08C 19/22 | (2006.01) | |
| C08C 19/25 | (2006.01) | |
| C08C 19/44 | (2006.01) | |

(52) U.S. Cl.
USPC .................. 525/333.1; 525/331.9; 525/333.2; 525/342; 525/343; 525/350; 525/353; 525/374; 525/375; 525/379; 525/384; 525/385; 525/386; 524/572

(58) Field of Classification Search
USPC ........ 525/331.9, 333.1, 333.2, 342, 343, 350, 525/353, 374, 375, 379, 384, 38, 5, 386; 524/572

See application file for complete search history.

(56) References Cited

U.S. PATENT DOCUMENTS

| | | | |
|---|---|---|---|
| 5,096,942 A | 3/1992 | Long et al. | |
| 6,117,927 A | 9/2000 | Toba et al. | |
| 6,228,908 B1 | 5/2001 | Takeichi et al. | |
| 6,294,624 B1 | 9/2001 | Inoue et al. | |
| 7,781,533 B2 * | 8/2010 | Ozawa et al. | 525/331.9 |
| 7,968,652 B2 * | 6/2011 | Kurazumi et al. | 525/351 |
| 2002/0019473 A1 | 2/2002 | Kayser et al. | |

FOREIGN PATENT DOCUMENTS

| | | |
|---|---|---|
| EP | 0 890 603 A1 | 1/1999 |
| JP | 2001-131230 A | 5/2001 |
| JP | 2001-131340 A | 5/2001 |
| JP | 2001-131343 A | 5/2001 |
| JP | 2001-131344 A | 5/2001 |
| JP | 2001-131345 A | 5/2001 |
| JP | 2001-139633 A | 5/2001 |
| JP | 2001-158832 A | 6/2001 |
| JP | 2001-158834 A | 6/2001 |
| JP | 2001-158835 A | 6/2001 |
| JP | 2001-302703 A | 10/2001 |
| JP | 2001-302704 A | 10/2001 |
| JP | 2001-335663 A | 12/2001 |
| WO | 01/34658 A1 | 5/2001 |
| WO | WO 01/34658 A1 * | 5/2001 |
| WO | 02/31040 A2 | 4/2002 |

* cited by examiner

*Primary Examiner* — Roberto Rabago
(74) *Attorney, Agent, or Firm* — Sughrue Mion, PLLC

(57) ABSTRACT

A process for producing a conjugated diene-based polymer which comprises, in the first modification, modifying a conjugated diene-based polymer having active chain ends, which is obtained by polymerizing a diene-based monomer singly or with other monomers and has a content of a cis-1,4 unit of 75% by mole or greater in the conjugated diene portion of the main chain, by reacting the active chain ends with a hydrocarbyloxysilane compound and reacting the modified polymer with a specific compound such as a hydrocarbyloxysilane compound, and a rubber composition containing the polymer modified in accordance with the above process and, preferably, 10 to 100 parts by weight of silica and/or carbon black per 100 parts by weight of the rubber component containing the modified polymer, are provided. The rubber composition containing silica and/or carbon black exhibits improved fracture properties, abrasion resistance, low heat buildup property and excellent workability. A process for producing a conjugated diene-based polymer exhibiting improved cold flow, a polymer produced in accordance with the process, and a rubber composition and a tire using the polymer are also provided.

5 Claims, No Drawings

CONJUGATED DIENE POLYMER, PROCESS FOR ITS PRODUCTION AND RUBBER COMPOSITIONS CONTAINING THE SAME

CROSS-REFERENCE TO RELATED APPLICATIONS

This is a Continuation of application Ser. No. 10/496,983, filed Nov. 5, 2004 now U.S. Pat. No. 7,781,533, which claims benefit from International Application No. PCT/JP02/12390, filed Nov. 27, 2002, which claims benefit from Japanese patent Application No. 2001-361354, filed on Nov. 27, 2001, the entire contents of each of which are incorporated herein by reference.

TECHNICAL FIELD

The present invention relates to a conjugated diene-based polymer, a process for producing the polymer and a rubber composition using the polymer. More particularly, the present invention relates to a conjugated diene-based polymer exhibiting improved low hysteresis loss property (low fuel consumption), enhanced reinforcement with fillers and suppressed formation of gel, a process for producing the polymer and a rubber composition and a pneumatic tire using the polymer.

BACKGROUND ART

Due to the social needs to save energy, recently, the decrease in the fuel consumption by automobiles is being extremely severely required. As for the properties of a tire, a further decrease in the rolling resistance is required in response to the requirement. As the method for decreasing the rolling resistance of a tire, the use of a material exhibiting smaller heat buildup as the rubber composition has been widely conducted although methods of optimizing the structure of the tire have also been studied.

To obtain a rubber composition exhibiting a small heat buildup, heretofore, many developments of technology on modifying rubber for rubber compositions using silica and carbon black as the filler have been conducted. In particular, the methods of modifying the interaction of fillers with active chain ends of diene-based polymers, which are obtained in accordance with the anionic polymerization using organo-lithium compounds, using alkoxysilane derivatives have been proposed as the effective method.

Many of these methods are applied to polymers which are easily provided with living active chain ends. However, rather few proposals are found for modification and improvement of cis-1,4-polybutadiene which is important, in particular, as the rubber for tire side walls and tire treads. Moreover, the sufficient effect of the modification on rubber compositions containing silica and carbon black has not always been obtained. In particular, it is the actual situation that almost no effect of the modification is obtained on the rubber compositions containing cis-1,4-polybutadiene and carbon black.

The conventional methods of the modification have a further problem in that cold flow is the major obstacle for the actual application since sufficient branching cannot be provided to the main chain and the effect of the modification inevitably decreases when partial coupling is made to overcome this problem.

On the other hand, it has been attempted that a conjugated diene polymer modified with a silane is obtained by the reaction of an alkoxysilane compound with active chain ends having a great cis-content which is obtained by using a rare earth catalyst. However, in accordance with this method, the increase in the Mooney viscosity due to the modification with the silane is marked in many cases although a great effect of improving the cold flow can be exhibited, and gel having a visible size is frequently formed in the separated copolymer.

Thus, improvements are required for this method from the standpoint of workability and properties.

DISCLOSURE OF THE INVENTION

Under the above circumstances, the present invention has an object of providing a process for producing a conjugated diene-based polymer which suppresses the formation of gel arising in the conventional processes, enhances the low hysteresis loss property and the reinforcing property and exhibits excellent abrasion resistance, mechanical properties and workability when the polymer is used for rubber compositions and improves cold flow, a polymer obtained in accordance with the process, and a rubber composition and a pneumatic tire using the polymer.

As the result of intensive studies by the present inventors to achieve the above object, it was found that bringing a hydrocarbyloxysilane compound into reaction with a polymer having active chain ends, followed by conducting a secondary reaction with a specific compound was useful. It was also found that the undesirable formation of gel was closely related to the change in catalyst residues during the heat treatment for removal of a solvent or the like due to the presence of water or oxygen, and the problem could be remarkably improved in accordance with the process of modification of the present invention.

The present invention has been completed based on this knowledge.

The present invention provides:

(1) A process for producing a conjugated diene-based polymer which comprises conducting a first modification of a conjugated diene-based polymer having active chain ends, which is obtained by polymerizing a diene-based monomer singly or in combination with other monomers and has a content of a cis-1,4 unit of 75% by mole or greater in a conjugated diene portion of a main chain, by bringing the active chain ends into reaction with a hydrocarbyloxysilane compound, and conducting a second modification of a polymer obtained by the first modification by adding a hydrocarbyloxysilane compound in a presence of a condensation accelerator;

(2) A process for producing a conjugated diene-based polymer which comprises conducting a first modification of a conjugated diene-based polymer having active chain ends, which is obtained by polymerizing a diene-based monomer singly or in combination with other monomers and has a content of a cis-1,4 unit of 75% by mole or greater in a conjugated diene portion of a main chain, by bringing the active chain ends into reaction with a hydrocarbyloxysilane compound, and bringing a polymer obtained by the first modification into reaction with a partial ester of a polyhydric alcohol with a carboxylic acid;

(3) A process for producing a conjugated diene-based polymer which comprises conducting a first modification of a conjugated diene-based polymer having active chain ends, which is obtained by polymerizing a diene-based monomer singly or in combination with other monomers and has a content of a cis-1,4 unit of 75% by mole or greater in a conjugated diene portion of a main chain, by bringing the active chain ends into reaction with a hydrocarbyloxysilane compound, adding a condensation accelerator, and conducting condensation of a residue group of the hydrocarbyloxysilane compound introduced at the active chain ends and the unreacted hydrocarbyloxysilane compound;

(4) A process for producing a conjugated diene-based polymer described above in (1), which further comprises bringing a polymer obtained by the second modification into reaction with a partial ester of a polyhydric alcohol with a carboxylic acid;

(5) A process for producing a conjugated diene-based polymer described above in (3), which further comprises bringing a polymer obtained by the condensation into reaction with a partial ester of a polyhydric alcohol with a carboxylic acid;

(6) A conjugated diene-based polymer which is produced in accordance with a process described above in any one of (1) to (5);

(7) A rubber composition which comprises a rubber component and fillers, wherein the rubber component comprises the conjugated diene-based polymer described above in (6); and (8) A pneumatic tire which comprises a rubber composition described above in (7) in a rubber member constituting the tire.

THE MOST PREFERRED EMBODIMENT TO CARRY OUT THE INVENTION

In the process of the present invention, a hydrocarbyloxysilane compound is brought into reaction with active chain ends of a conjugated diene-based polymer which has a content of a cis-1,4 unit of 75% by mole or greater and has the active chain ends, and, thereafter, the residue group of the hydrocarbyloxysilane compound introduced into the chain ends is brought into reaction with a specific compound.

The process for producing the polymer which has a content of a cis-1,4 unit of 75% by mole or greater and has the active chain ends is not particularly limited. Any of the solution polymerization, the gas phase polymerization and the bulk polymerization can be used, and the solution polymerization is preferable. The polymerization process may be any of the batch process and the continuous process.

Examples of the conjugated diene compound used as the monomer include 1,3-butadiene, isoprene, 1,3-pentadiene, 2,3-dimethylbutadiene, 2-phenyl-1,3-butadiene and 1,3-hexadiene. The conjugated diene compound may be used singly or in combination of two or more. Among these compounds, 1,3-butadiene is preferable.

Small amounts of other monomers may be present in combination with the above conjugated diene monomer.

However, it is preferable that the conjugated diene monomer is present in an amount of 80% by mole or more in the entire monomers.

The process for producing an intermediate of the conjugated diene-based polymer having 75% or greater of the cis-1,4 unit is not particularly limited. It is preferable that a combination of at least one compound selected from each of components shown in (A), (B) and (C) in the following is used.

Component (A)

Compounds of rare earth elements selected from the following (A1) to (A4), which may be directly used as a solution in an inert organic solvent or in a form supported with an inert solid.

(A1) Compounds of rare earth elements having an oxidation number of 3 and having three ligands selected from carboxyl groups having 2 to 30 carbon atoms, alkoxyl groups having 2 to 30 carbon atoms, aryloxy groups having 6 to 30 carbon atoms and α,γ-diketonyl groups having 5 to 30 carbon atoms and complex compounds of these compounds with Lewis base compounds which are selected from free carboxylic acids, free alcohols, α,γ-diketones, cyclic ethers, linear ethers, trihydrocarbylphosphines and trihydrocarbyl phosphites.

Examples of compound (A1) include neodymium tri-2-ethylhexanoate, a complex compound thereof with acetylacetone, neodymium trineodecanoate, a complex thereof with acetylacetone and neodymium tri-n-butoxide.

(A2) Complex compounds of trihalides of rare earth elements with Lewis acids. Examples include a THF complex of neodymium trichloride.

(A3) Organic compounds of rare earth elements having an oxidation number of 3 in which at least one (substituted) allyl group is directly bonded to a rare earth atom. Examples include lithium salts of tetraallylneodymiums.

(A4) Organic compounds of rare earth elements having an oxidation number of 2 or 3 and having at least one (substituted) cyclopentadienyl group directly bonded to the rare earth atom and reaction products of the organic rare earth compounds and trialkylaluminums or ionic compounds comprising a non-coordinating anion and a counter cation.

Examples include dimethylaluminum-(μ-dimethyl)bis(pentamethylcyclopentadienyl)-samarium.

As the rare earth element in the above rare earth compounds, lanthanum, neodymium, praseodymium, samarium and gadolinium are preferable, and lanthanum, neodymium and samarium are more preferable.

Among the above compounds of component (A), neodymium salts of carboxylic acids and substituted cyclopentadienyl compounds of samarium are preferable.

Component (B)

At least one organoaluminum compound selected from the following (B1) to (B3). A plurality of compounds may be used in combination.

(B1) Trihydrocarbylaluminum compounds represented by the formula $R^{12}_3Al$, wherein $R^{12}$ represents a hydrocarbon group having 1 to 30 carbon atoms and may represent the same group or different groups.

(B2) Hydrocarbylaluminum hydride represented by the formula $R^{13}_2AlH$ or $R^{13}AlH_2$, wherein $R^{13}$ represents a hydrocarbon group having 1 to 30 carbon atoms, and a plurality of $R^{13}$ may represent the same group or different groups when the plurality of $R^{13}$ are present.

(B3) Hydrocarbylaluminoxane compound having hydrocarbon groups having 1 to 20 carbon atoms.

Examples of the compounds of component (B) include trialkylaluminums, dialkylaluminum hydrides, alkylaluminum dihydrides and alkylaluminoxanes. These compounds may be used as a mixture. Among the compounds of (B), combinations of aluminoxanes and other organoaluminum compounds are preferable.

Component (C)

A compound selected from the compounds shown in (C1) to (C4). However, component (C) is not essential when component (A) comprises a halogen or a non-coordinating anion or component (B) comprises an aluminoxane.

(C1) Inorganic and organic compounds of elements of Groups II, III and IV having hydrolyzable halogen atom and complex compounds thereof with Lewis bases. Examples include alkylaluminum dihalides, dialkylaluminum halides, silicon tetrachloride, tin tetrachloride, complexes of zinc chloride with Lewis bases such as alcohols and complexes of magnesium chloride with Lewis bases such as alcohols.

(C2) Organic halogen compounds having at least one structure selected from tertiary alkyl halides, benzyl halides and allyl halides. Examples include benzyl chloride, t-butyl chloride, benzyl bromide and t-butyl bromide.

(C3) Zinc halides and complex compounds thereof with Lewis acids; and (C4) Ionic compounds comprising a non-coordinating anion and a counter cation. For example, triphenylcarbonium tetrakis-(pentafluorophenyl)borate is preferable.

For the preparation of the above catalyst, where necessary, the same conjugated diene monomer as that used for the polymerization and/or a non-conjugated diene monomer may be preliminarily used in combination with components (A), (B) and (C) described above.

A portion or the entire amount of component (A) or (C) may be used in the form supported on an inert support. In this case, the polymerization can be conducted in accordance with the so-called gas phase polymerization.

The amount of the above catalyst can be suitably decided.

In general, the amount of component (A) is in the range of 0.001 to 0.5 mmole per 100 g of the monomer. The ratio of the amount by mole of component (B) to the amount by mole of component (A) is in the range of 5 to 1,000, and the ratio of the amount by mole of component (C) to the amount by mole of component (A) is in the range of 0.5 to 10.

The solvent used in the solution polymerization is an organic solvent inert to the reaction, examples of which include hydrocarbon solvents such as aliphatic, alicyclic and aromatic hydrocarbon compounds. Among the above compounds, compounds having 3 to 8 carbon atoms are preferable.

Examples of the compound having 3 to 8 carbon atoms include propane, n-butane, isobutane, n-pentane isopentane, n-hexane, cyclohexane, propene, 1-butene, isobutene, trans-2-butene, cis-2-butene, 1-pentene, 2-pentene, 1-hexene, 2-hexene, benzene, toluene, xylene and ethylbenzene. These solvents may be used singly or in combination of two or more.

It is preferable that the temperature of the polymerization is selected in the range of −80 to 150° C. and more preferably in the range of −20 to 120° C. The polymerization may be conducted under the pressure formed by the reaction. However, in general, it is preferable that the polymerization is conducted under a pressure sufficient for keeping the monomer substantially in the liquid state. The pressure depends on the individual substances used for the polymerization, the medium of the polymerization and the temperature of the polymerization. Where desired, a higher pressure may be applied. The higher pressure can be obtained in accordance with a suitable method such as the application of the pressure to the reactor with a gas inert to the polymerization.

In the polymerization, it is preferable that the all materials taking part in the polymerization such as the catalyst, the solvent and the monomer are used after substances adversely affecting the reaction such as water, oxygen, carbon dioxide and protonic substances are substantially removed.

In the process of the present invention, it is preferable in the reaction of the first modification that at least 10% of the chain in the used polymer has the living property.

In the first modification, it is preferable that hydrocarbyloxysilane compounds represented by general formula (I) and/or partial condensation products thereof are used as the hydrocarbyloxysilane compound which is used for the reaction with the active chain ends of the polymer. General formula (I) is:

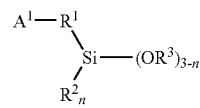

wherein $A^1$ represents a monovalent group having at least one functional group selected from (thio)epoxy group, (thio)isocyanate group, (thio)ketone group, (thio)aldehyde group, imine group, amide group, trihydrocarbyl ester group of isocyanuric acid, (thio)carboxylic acid ester groups, alkali metal salts and alkaline earth metal salts of (thio)carboxylic acid ester groups, carboxylic acid anhydride groups, carboxylic acid halide groups and dihydrocarbyl ester groups of carbonic acid; $R^1$ represents a single bond or a divalent inert hydrocarbon group, $R^2$ and $R^3$ each independently represent a monovalent aliphatic hydrocarbon group having 1 to 20 carbon atoms or a monovalent aromatic hydrocarbon group having 6 to 18 carbon atoms; n represents an integer of 0 to 2; a plurality of $OR^3$ may represent the same group or different groups when the plurality of $OR^3$ are present; and no active protons or onium salts are present in a molecule.

In the above general formula (I), the imine group as the functional group represented by $A^1$ includes ketimine groups, aldimine groups and amidine groups, and the (thio)carboxylic acid ester group as the functional group represented by $A^1$ includes unsaturated carboxylic acid ester groups such as acrylates and methacrylates. Examples of the metal in the metal salt of (thio)carboxylic acid groups include alkali metals, alkaline earth metals, Al, Sn and Zn.

Examples of the divalent inert hydrocarbon group represented by $R^1$ include alkylene groups having 1 to 20 carbon atoms. The alkylene group may be linear, branched or cyclic. Linear alkylene groups are preferable. Examples of the linear alkylene group include methylene group, ethylene group, trimethylene group, tetramethylene group, pentamethylene group, hexamethylene group, octamethylene group, decamethylene group and dodecamethylene group.

Examples of the group represented by $R^2$ or $R^3$ include alkyl groups having 1 to 20 carbon atoms, alkenyl groups having 2 to 18 carbon atoms, aryl groups having 6 to 18 carbon atoms and aralkyl groups having 7 to 18 carbon atoms. The alkyl group and the alkenyl group may be linear, branched or cyclic. Examples of these groups include methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group and cyclohexenyl group.

The aryl group may have a substituent such as a lower alkyl group on the aromatic ring. Examples of the aryl group include phenyl group, tolyl group, xylyl group and naphthyl group. The aralkyl group may have a substituent such as a lower alkyl group on the aromatic ring. Examples of the aralkyl group include benzyl group, phenetyl group and naphthylmethyl group.

n represents an integer of 0 to 2 and preferably 0. It is necessary that no active protons or onium salts are present in the molecule.

Examples of the hydrocarbyloxysilane compound having (thio)epoxy group as the hydrocarbyloxysilane compound represented by general formula (I) include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxy-cyclohexyl)ethyltrimethoxysilane, 2-(3,4-epoxycyclohexyl) ethyltriethoxysilane, 2-(3,4-epoxycyclohexyl)ethyl(methyl) dimethoxysilane and compounds obtained by replacing epoxy group in the above compounds with thioepoxy group. Among these compounds, 3-glycidoxypropyltrimethoxysilane and 2-(3,4-epoxycyclohexyl)trimethoxysilane are preferable.

Examples of the hydrocarbyloxysilane compound having imine group include N-(1,3-dimethylbutylidene)-3-(triethoxysilyl)-1-propane amine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and trimethoxysilyl compounds, methyldiethoxysilyl compounds, ethyldiethoxysilyl compounds, methyldimethoxysilyl compounds and ethyldimethoxysilyl compounds corresponding to the above triethoxysilyl compounds. Among these compounds, N-(1-methylpropylidene)-3-(triethoxysilyl)-1-propaneamine and N-(1,3-dimethylbutylidene)-3-(triethoxysilyl)-1-propaneamine are preferable.

Examples of other hydrocarbyloxy compounds include the following compounds. Examples of the compound having imine(amidine) group include 1-[3-(triethoxysilyl)propyl]-4,5-dihydroimidazole, 1-[3-(trimethoxysilyl)propyl]-4,5-dihydroimidazole and 3-[10-(triethoxysilyl)decyl]-4-oxazoline. Among these compounds, 3-(1-hexamethyleneimino) propyl(triethoxy)silane, (1-hexamethyleneimino)methyl (trimethoxy)silane, 1-[-3-(triethoxysilyl)propyl]-4,5-dihydroimidazole and 1-[3-(trimethoxysilyl)propyl]-4,5-dihydroimidazole are preferable. Further examples include N-(3-triethoxysilylpropyl)-4,5-dihydroimidazole, N-(3-isopropoxysilylpropyl)-4,5-dihydroimidazole and N-(3-methyldiethoxysilylpropyl)-4,5-dihydroimidazole. Among these compounds, N-(3-triethoxysilylpropyl)-4,5-dihydroimidazole is preferable.

Examples of the compound having a carboxylic acid ester group include 3-methacryloyloxypropyltriethoxysilane, 3-methacryloyloxypropyltrimethoxysilane, 3-methacryloyloxypropylmethyldiethoxysilane and 3-methacryloyloxypropyltriisopropoxysilane. Among these compounds, 3-methacryloyloxypropyltrimethoxysilane is preferable. Examples of the compound having isocyanate group include 3-isocyanatopropyltrimethoxysilane, 3-isocyanatopropyltriethoxysilane, 3-isocyanatopropylmethyldiethoxysilane and 3-isocyanatopropyltriisopropoxysilane. Among these compounds, 3-isocyanatopropyltriethoxysilane is preferable. Examples of the carboxylic acid anhydride include 3-triethoxysilylpropylsuccinic anhydride, 3-trimethoxysilylpropylsuccinic anhydride and 3-methyldiethoxysilylpropylsuccinic anhydride. Among these compounds, 3-triethoxysilylpropylsuccinic anhydride is preferable.

The hydrocarbyloxysilane compound may be used singly or in combination of two or more. Partial condensation products of the above hydrocarbyloxysilane compounds may also be used.

In the above first modification, the chain ends of the polymer having the active ends and the hydrocarbyloxysilane compound are first brought into the reaction. It is necessary that the introduced residue group is then treated in accordance with one of the processes of (1) the reaction with a partial ester of a polyhydric alcohol with a carboxylic acid for stabilization or (2) the reaction with the residual or freshly added hydrocarbyloxysilane compound in the presence of a condensation accelerator. As the latter process (2), one of the following processes (2-1) to (2-3) can be conducted:

(2-1) After the first modification, the fresh hydrocarbyloxysilane compound and a condensation accelerator is added, and the second modification is conducted;

(2-2) After the first modification, a condensation accelerator is added, and the condensation of the residual group of hydrocarbyl-oxysilane compound introduced into the chain ends and the unreacted hydrocarbyloxysilane is conducted; and (2-3) After the reaction described above in (2-1) or (2-2), the reaction with a partial ester of a polyhydric alcohol with a carboxylic acid is conducted for stabilization.

The partial ester of a polyhydric alcohol with a carboxylic acid is a partial ester which is an ester of a polyhydric alcohol with a carboxylic acid and has at least one hydroxyl group. Specifically, esters of sugars or modified sugars having 4 or more carbon atoms and fatty acids are preferable. More preferable examples of the ester include (a) partial esters of polyhydric alcohols with fatty acids and still more preferably partial esters of polyhydric alcohols with saturated or unsaturated higher fatty acids having 10 to 20 carbon atoms which may be monoesters, diesters or triesters and (b) ester compounds obtained by bonding 1 to 3 molecules of partial esters of polybasic carboxylic acids and higher alcohols to polyhydric alcohols.

As the polyhydric alcohol used as the material for the above partial ester, sugars having at least 3 hydroxyl groups and 5 or 6 carbon atoms which may be hydrogenated or not hydrogenated, glycols and polyhydroxyl compounds are preferable. As the fatty acid used as the material, saturated or unsaturated fatty acids having 10 to 20 carbon atoms such as stearic acid, lauric acid and palmitic acid are preferable.

Among the partial esters of polyhydric alcohols with fatty acids, esters of fatty acids with sorbitan are preferable. Specific examples of the partial ester include sorbitan monolaurate, sorbitan monopalmitate, sorbitan monostearate, sorbitan tristearate, sorbitan monooleate and sorbitan trioleate.

Examples of the commercial products include SPAN 60 (sorbitan stearate), SPAN 80 (sorbitan monooleate) and SPAN 85 (sorbitan trioleate), which are trade names by ICI Company.

It is preferable that the amount of the partial ester is in the range of 0.2 to 10 moles and more preferably in the range of 1 to 10 moles per 1 mole of the hydrocarbyloxysilyl group provided to the polymer.

As the hydrocarbyloxysilane compound described above, a hydrocarbyloxysilane compound represented by general formula (II) and/or a partial condensation product thereof may be used in combination with the hydrocarbyloxysilane compound represented by general formula (I) and/or the partial condensation product thereof. General formula (II) is:

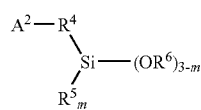

wherein $A^2$ represents a monovalent group having at least one functional group selected from cyclic tertiary amine groups, acyclic tertiary amine groups, pyridine groups, sulfide groups, polysulfide groups and nitrile groups; $R^4$ represents a single bond or a divalent inert hydrocarbon group, $R^5$ and $R^6$ each independently represent a monovalent aliphatic hydrocarbon group having 1 to 20 carbon atoms or a monovalent aromatic group having 6 to 18 carbon atoms; m represents an integer of 0 to 2; a plurality of $OR^6$ may represent the same group or different groups when the plurality of $OR^6$ are present; and no active protons or onium salts are present in a molecule.

The partial condensation product is a compound having the bond SiOSi formed by the condensation of a portion of (but not the entire amount of) SiOR of the hydrocarbyloxysilane compound.

The hydrocarbyloxysilane compound represented by general formula (II) and/or the partial condensation product thereof does not directly react with the active chain ends substantially and remains in the reaction system as the unreacted substance. Therefore, the compound and/or the condensation product is consumed by the condensation with the residue group of the hydrocarbyloxysilane compound introduced into the active chain ends.

The acyclic tertiary amine represented by $A^2$ in general formula (II) shown above can include N,N-(disubstituted) aromatic amines such as N,N-(disubstituted) anilines. The cyclic tertiary amine can have (thio)ethers as a portion of the ring. The divalent inert hydrocarbon group represented by $R^4$ and the groups represented by $R^5$ or $R^6$ are the same as those represented by $R^1$, $R^2$ and $R^3$, respectively, in general formula (I). It is necessary that no active protons or onium salts are present in a molecule.

Examples of the hydrocarbyloxysilane compound having the acyclic tertiary amine group as the hydrocarbyloxysilane compound represented by general formula (II) include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane and 3-dibutylaminopropyl(triethoxy)silane. Among these compounds, 3-diethylaminopropyl(triethoxy)silane and 3-dimethylaminopropyl(triethoxy)silane are preferable.

Examples of the hydrocarbyloxysilane compound having the cyclic tertiary amine group include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane and 3-(1-hexamethyleneimino)propyl(diethoxy)ethylsilane. Among these compounds, 3-(1-hexamethyleneimino)propyl(triethoxy)silane is preferable.

Examples of the other hydrocarbyloxysilane compound include 2-(trimethoxysilylethyl)pyridine, 2-(triethoxysilylethyl)pyridine and 4-ethylpyridine.

The hydrocarbyloxysilane compound may be used singly or in combination of two or more. Partial condensation products of these hydrocarbyloxysilane compounds can also be used.

In process (2-1) described above, as hydrocarbyloxysilane compound II which is condensed with the residue group of hydrocarbyloxysilane compound I introduced into the active chain ends of the polymer, at least one compound selected from hydrocarbyloxysilane compounds represented by general formula (I), partial condensation products thereof, hydrocarbyloxysilane compounds represented by general formula (II), partial condensation products thereof, hydrocarbyloxysilane compounds represented by general formula (III) and partial condensation products thereof can be used. General formula (III) is:

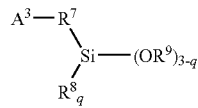

wherein $A^3$ represents a monovalent group having at least one functional group selected from alcohol groups, thiol groups, primary amine groups, onium salts thereof, cyclic secondary amine groups, onium salts thereof, acyclic amine groups, onium salts thereof, onium salts of cyclic tertiary amine groups, onium salts of acyclic tertiary amine groups, groups having allyl group or benzyl-Sn bond, sulfonyl group, sulfinyl group and nitrile group; $R^7$ represents a single bond or a divalent inert hydrocarbon group, $R^8$ and $R^9$ each independently represent a monovalent aliphatic hydrocarbon group having 1 to 20 carbon atoms or a monovalent aromatic group having 6 to 18 carbon atoms; q represents an integer of 0 to 2; a plurality of $OR^9$ may represent the same group or different groups when the plurality of $OR^9$ are present.

In general formula (III) shown above, the primary amine represented by $A^3$ includes aromatic amines such as aniline, and the acyclic secondary amine represented by $A^3$ includes N-(monosubstituted) aromatic amines such as N-(monosubstituted) anilines. The onium salt of an acyclic tertiary amine represented by $A^3$ includes onium salts of N,N-(disubstituted) aromatic amines such as N,N-(disubstituted) anilines. The cyclic secondary amine and the cyclic tertiary amine may have (thio)ether as a portion of the ring. The divalent inert hydrocarbon group represented by $R^7$ and groups represented by $R^8$ and $R^9$ are the same as those represented by $R^1$, $R^2$ and $R^3$, respectively, in general formula (I) shown above.

Examples of the hydrocarbyloxysilane compound represented by general formula (III) include 3-aminopropyltrimethoxysilane, 3-aminopropyltriethoxysilane, hydroxymethyltrimethoxysilane, hydroxymethyltriethoxysilane, mercaptomethyltrimethoxysilane, mercaptomethyltriethoxysilane, aminophenyltrimethoxysilane, aminophenyltriethoxysilane, 3-(N-methylamino)propyltrimethoxysilane, 3-(N-methylamino)propyltriethoxysilane, octadecyldimethyl(3-trimethylsilylpropyl)ammonium chloride, octadecyldimethyl(3-triethylsilylpropyl)ammonium chloride, cyanomethyltrimethoxysilane, cyanomethyltriethoxysilane, sulfonylmethyltrimethoxysilane, sulfonylmethyltriethoxysilane, sulfinylmethyltrimethoxysilane and sulfinylmethyltriethoxysilane.

Hydrocarbyloxysilane compound II may be used singly or in combination of two or more.

In the present invention, for process (2) described above which comprises the reaction with the residual or freshly added hydrocarbyloxysilane compound in the presence of a condensation accelerator, the polymer having the active chain ends and hydrocarbyloxysilane I added to the reaction system in a substantially stoichiometric amount are first brought into the reaction with each other, and hydrocarbyloxysilyl group is introduced into the substantially entire chain ends (the first modification). A compound having hydrocarbyloxyl group is brought into reaction with the hydrocarbyloxysilyl group introduced above, and the residue group of hydrocarbyloxysilane compound in an amount more than the equivalent amount is introduced in the active chain ends. Therefore, a greater effect on the low heat buildup property and the workability can be exhibited, and process (2) described above is preferable to process (1) described above.

In the present invention, when the hydrocarbyloxysilane compound is an alkoxysilyl compound, it is preferable that the condensation between the alkoxysilyl groups in process (2) described above takes place between the free alkoxysilane (residual or freshly added) and the alkoxysilyl group at the chain ends, and, in some cases, between the alkoxysilyl groups at the chain ends. The reaction between the free alkoxysilanes is not necessary. Therefore, when the alkoxysilane compound is freshly added, it is preferable from the standpoint of the efficiency that the reactivity of hydrolysis of the freshly added alkoxysilane compound is not greater than the reactivity of hydrolysis of the alkoxysilyl group at the chain ends. For example, a combination such that a compound having trimethoxysilyl group having a great reactivity of hydrolysis is used as alkoxysilane I and, as the freshly added alkoxysilane II, a compound having an alkoxysilyl group having a smaller reactivity of hydrolysis than alkoxysilane II such as triethoxysilyl group is used, is preferable. In contrast, for example, a combination such that a compound having triethoxysilyl group is used as alkoxysilane I and a compound having trimethoxysilyl group is used as alkoxysilane II is not preferable from the standpoint of the efficiency of the reaction although this combination is included in the present invention.

For the modification in the present invention, any of the solution polymerization and the solid phase polymerization can be used. The solution polymerization is preferable and may be conducted in a solution containing the unreacted monomer used in the polymerization. The form of the polymerization is not particularly limited, and the batch reaction using a batch reactor may be conducted, or the continuous reaction using a multi-stage reactor or a inline mixer may be conducted. It is important that the modification is conducted after the polymerization has been completed and before the treatment for removal of the solvent, the treatment with water, the treatment by heating and treatments necessary for separation of the polymer are conducted.

The temperature of the modification can be held at the temperature of the polymerization of the conjugated diene-based polymer. Specifically, a temperature in the range of 20 to 100° C. is preferable. When the temperature is lowered, viscosity of the polymer tends to increase. When the temperature is elevated, the active chain ends tend to be deactivated. Therefore, a temperature outside the above range is not preferable.

To accelerate the second modification described above, it is preferable that the modification is conducted in the presence of a condensation accelerator. As the condensation accelerator, a combination of metal compounds widely known as the curing catalyst for the room temperature vulcanizable (RTV) silicone of the alkoxy condensation curing type and water can be used. For example, the combination of a salt of tin with a carboxylic acid and/or a titanium alkoxide and water is preferable. The process for adding water used in the condensation accelerator into the reaction system is not particularly limited. A solution in an organic solvent compatible with water such as an alcohol may be used. Water may also be directly injected, dispersed or dissolved into a hydrocarbon solvent using one of various chemical engineering processes.

It is preferable that the condensation accelerator described above is a combination of at least one metal compound selected from metal compounds described in (1) to (3) in the following and water.

(1) Salts of tin having an oxidation number of 2 with carboxylic acids having 3 to 30 carbon atoms represented by the following general formula:

wherein $R^{10}$ represents an organic group having 2 to 19 carbon atoms, and a plurality of $R^{10}$ may represent the same group or different groups when the plurality of $R^{10}$ are present.

(2) Compounds of tin having an oxidation number of 4 and represented by the following general formula:

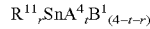

wherein r represents an integer of 1 to 3, t represents an integer of 1 or 2 and t+r represents an integer of 3 or 4; $R^{11}$ represents an aliphatic hydrocarbon group having 1 to 30 carbon atoms; $B^1$ represents hydroxyl group or a halogen atom; and $A^4$ represents a group selected from (a) carboxyl groups having 2 to 30 carbon atoms, (b) α,γ-dionyl groups having 5 to 30 carbon atoms, (c) hydrocarbyloxyl groups having 3 to 30 carbon atoms and (d) siloxyl groups having three substituents which are selected from hydrocarbyl groups having 1 to 20 carbon atoms and hydrocarbyloxyl groups having 1 to 20 carbon atoms, and the three substituents may be same with or different from each other, and a plurality of $A^4$ may represent the same group or different groups when the plurality of $A^4$ are present.

(3) Compounds of titanium having an oxidation number of 4 and represented by the following general formula:

wherein x represents an integer of 2 or 4; $A^5$ represents (a) a hydrocarbyloxyl group having 3 to 30 carbon atoms or (b) a siloxyl group having three substituents which are selected from alkyl groups having 1 to 30 carbon atoms and hydrocarbyloxyl groups having 1 to 20 carbon atoms, and a plurality of $A^5$ may represent the same group or different groups when the plurality of $A^5$ are present; and $B^2$ represents an α,γ-dionyl group having 5 to 30 carbon atoms.

As the salt of tin with a carboxylic acid described above, specifically, (1) salts of divalent tin with dicarboxylic acids (which is preferably salts of carboxylic acids having 8 to 20 carbon atoms) and (2) salts of tetravalent dihydrocarbyltin with dicarboxylic acids [including salts of bis(hydrocarbyldicarboxylic acids)], bis(α,γ-diketonates)alkoxy halides, monocarboxylic acid salt hydroxides, alkoxy(trihydrocarbylsiloxides), alkoxy(dihydrocarbylalkoxysiloxides), bis(trihydrocarbylsiloxides) and bis(dihydrocarbylalkoxysiloxides, are preferable. As the hydrocarbyl group directly bonded to the tin atom, hydrocarbyl groups having 4 or more carbon atoms are preferable, and hydrocarbyl groups having 4 to 8 carbon atoms are more preferable.

Examples of the titanium compound described above include tetraalkoxides, dialkoxybis(α,γ-diketonates) and tetrakis(trihydrocarbyloxysiloxides) of titanium having an oxidation number of 4, and tetraalkoxides are preferable. As water, water itself or water in the form of a solution, for example, in an alcohol, or in the form of micelles dispersed in a hydrocarbon solvent can be used. Where necessary, water latently contained in a compound which can discharge water in the reaction system such as water adsorbed on the surface of a solid or water in a hydrate can also be effectively used.

These two components constituting the condensation accelerator may be added to the reaction system separately or as a mixture prepared immediately before the reaction. It is not preferable that the mixture is kept for a long time since the metal compound is decomposed.

As for the amount of the condensation accelerator, it is preferable that the ratios of the amount by mole of the metal in the metal compound described above and the amount by mole of water effective for the reaction to the amount by mole of the entire hydrocarbyloxysilyl group present in the reaction system are both 0.1 or greater. It is preferable that water effective for the reaction is present in an amount such that the ratio of the amount by mole of the effective water to the amount by mole of the entire hydrocarbyloxysilyl group bonded to the chain ends of the polymer before the condensation is in the range of about 0.5 to 3 although the upper limit is different depending on the object and the condition of the reaction. It is preferable that the ratio of the amount by mole of the metal in the metal compound described above to the amount by mole of water effective for the reaction described above is in the range of 1/0.5 to 1/20 although the preferable ratio is different depending on the condition of the reaction.

In the present invention, after the hydrocarbyloxysilane compound is brought into reaction with the active chain ends of the polymer and then reaction is allowed to proceed by addition of the condensation accelerator, the ester of a polyhydric alcohol with a carboxylic acid described above may be brought into a further reaction.

In the present invention, where desired, conventional antioxidants and short stop agents may be added during the modification after the residue group of the hydrocarbyloxysilane compound has been introduced into the active chain ends of the polymer.

After the above modifications, conventional post treatments are conducted, and the modified polymer of the object substance can be obtained. The analysis of the groups at the chain ends of the modified polymer can be conducted in accordance with the chromatography using a liquid as the carrier such as the high performance liquid chromatography (HPLC) and the thin layer chromatography and the nuclear magnetic resonance spectroscopy (NMR).

It is preferable that the Mooney viscosity ($ML_{1+4}$, 100° C.) of the modified polymer is in the range of 10 to 150 and more preferably in the range of 15 to 70. When the Mooney viscosity decreases, the physical properties such as the fracture properties tend to decrease. When the Mooney viscosity increases, the workability becomes poor, and the mixing with compounding ingredients becomes difficult.

The present invention also provides the modified polymer obtained as described above.

When the modified polymer of the present invention is used as a rubber component in a rubber composition containing inorganic compounds such as silica and carbon black as the fillers, the interaction with the filler is enhanced for any types of the filler. Thus, the fracture properties, the abrasion resistance and the low heat buildup property can be improved simultaneously, and the excellent workability can be exhibited.

It is preferable that the rubber composition of the present invention comprises the modified polymer described above at least in an amount of 30% by weight. When the amount is less than 30% by weight, it is difficult that the rubber composition exhibiting the desired properties is obtained, and the object of the present invention is not achieved, occasionally. It is more preferable that the modified polymer is comprised in an amount of 35% by weight or greater and most preferably in an amount in the range of 40 to 100% by weight.

The modified polymer may be used singly or in combination of two or more. Other rubber components such as natural rubber and diene-based synthetic rubbers may be used in combination with the modified polymer. Examples of the diene-based synthetic rubber include styrene-butadiene copolymers (SBR), polybutadiene (BR), polyisoprene (IR), butyl rubber (IIR), ethylene-propylene copolymers and mixtures of these rubbers. The rubber may have a portion having a branched structure formed by using a polyfunctional modifier such as tin tetrachloride and silicon tetrachloride.

It is preferable that the rubber composition of the present invention comprises fillers. As the filler, any filler can be used as long as the filler can be used for conventional rubber compositions. Examples of the filler include carbon black and inorganic fillers. Among these fillers, carbon black, silica and alumina are preferable.

Carbon black is not particularly limited. For example, SRF, GPF, FEF, HAF, ISAF and SAF can be used. Carbon black having an iodine adsorption (IA) of 60 mg/g or greater and a dibutyl phthalate absorption (DBP) of 80 ml/100 g or greater is preferable. The effect of improving the gripping property and the fracture properties is increased by using carbon black. HAF, ISAF and SAF providing excellent abrasion resistance are more preferable.

Silica is not particularly limited. Examples of silica include wet silica (hydrated silicic acid), dry silica (anhydrated silicic acid), calcium silicate and aluminum silicate. Among these types of silica, the wet silica which most remarkably exhibits the effect of improving the fracture properties and simultaneously improving the wet gripping property and the low rolling resistance is more preferable.

As alumina, alumina represented by the following general formula (IV) is preferable:

$$Al_2O_3 \cdot nH_2O \qquad (IV)$$

wherein n represents a number of 1 to 3.

As the other inorganic filler, substances represented by the following general formula (V) are preferable:

$$mM_1 \cdot xSiO_y \cdot zH_2O \qquad (V)$$

wherein $M_1$ represents at least one substance selected from metals selected from the group consisting of aluminum, magnesium, titanium and calcium, oxides and hydroxides of these metals and hydrates of these substances, and m, x, y and z represent integers of 1 to 5, 0 to 10, 2 to 5 and 0 to 10, respectively.

Metals such as potassium, sodium, iron and magnesium and elements such as fluorine may be further comprised.

Examples of the inorganic filler include silica, hydrate of alumina ($Al_2O_3 \cdot H_2O$), aluminum hydroxide [$Al(OH)_3$] such as gibbsite and bayerite, magnesium hydroxide (MgO), magnesium oxide (MgO), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophillite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$ and the like), magnesium silicate ($Mg_2SiO_4$, $MgSiO_3$ and the like), calcium silicate ($Ca_2 \cdot SiO_4$ and the like), aluminum calcium silicate ($Al_2O_3 \cdot CaO \cdot 2SiO_2$ and the like), magnesium calcium silicate ($CaMgSiO_4$), hydrogen which adjusts the charge such as various types of zeolite, feldspar and mica. In general formula (V) representing the inorganic filler, it is preferable that $M^1$ represents aluminum.

It is preferable that the inorganic filler has a diameter of 10 µm or smaller and more preferably 3 µm or smaller. When the diameter of the inorganic filler is 10 µm or smaller, the fracture properties and the abrasion resistance of the vulcanized rubber composition can be kept excellent.

In the present invention, the inorganic filler may be used singly or in combination of two or more. The filler is used in an amount in the range of 10 to 250 parts by weight per 100 parts by weight of the rubber component. From the standpoint of the reinforcing property and the effect thereof to improve various physical properties, it is preferable that the amount is in the range of 10 to 100 parts by weight. When the amount is less than the above range, the effect of improving the fracture properties is not sufficient. When the amount exceeds the above range, the workability tends to be poor.

The rubber composition of the present invention comprises the modified polymer obtained in accordance with the process described above. In general, a composition comprising a rubber component comprising at least 30% by weight of the modified polymer and 10 to 100 parts by weight of silica and/or carbon black per 100 parts by weight of the rubber component is used.

When silica is used as the reinforcing filler in the rubber composition of the present invention, a silane coupling agent can be added so that the reinforcing property of silica is further enhanced. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropoyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide and dimethoxymethylsilylpropylbenzothiazolyl tetrasulfide. Among these compounds, bis(3-triethoxysilylpropyl) polysulfides and 3-trimethoxysilylbenzothiazyl tetrasulfide are preferable from the standpoint of the effect of improving the reinforcing property. The silane coupling agent may be used singly or in combination of two or more.

In the rubber composition of the present invention, since the modified polymer having the functional group exhibiting a great affinity with silica and introduced into the chain ends is used, the amount of the silane coupling agent can be decreased from that in conventional rubber compositions. In general, the silane coupling agent is used in an amount in the range of 1 to 20% by weight although the preferable amount is different depending on the type of the silane coupling agent. When the amount of the silane coupling agent is less than the above range, it is difficult that the effect as the coupling agent is sufficiently exhibited. When the amount exceeds the above range, there is the possibility that gelation of the rubber component takes place. From the standpoint of the effect as the coupling agent and the prevention of the formation of gel, it is preferable that the amount of the silane coupling agent is in the range of 5 to 15% by weight.

Where necessary, the rubber composition of the present invention may comprise various chemicals conventionally used in the rubber industry such as vulcanizing agents, vulcanization accelerators, process oils, antioxidants, scorch inhibitors, zinc oxide and stearic acid as long as the object of the present invention is not adversely affected.

The rubber composition of the present invention can be obtained by mixing the components using a mixer, for example, an open mixer such as rolls or a closed mixer such as a Banbury mixer. The rubber composition can be vulcanized after forming and applied to various rubber products. For example, the composition can be applied to tire members such as tire treads, under-treads, carcasses, side walls and beads and other industrial rubber products such as vibration isolation rubbers, dock fenders, belts and hoses. The composition is particularly advantageously applied to rubber for tire treads.

The pneumatic tire of the present invention using the rubber composition described above can exhibit excellent durability due to the enhanced reinforcing property with the filler while the low fuel consumption is surely maintained. Examples of the gas filling the tire include the air and inert gases such as nitrogen.

EXAMPLES

The present invention will be described more specifically with reference to examples in the following. However, the present invention is not limited to the examples.

The properties of the polymer were evaluated in accordance with the following methods.

<<Physical Properties of a Polymer>>

The microstructure of the butadiene portion of a polymer was obtained in accordance with the infrared spectroscopy (the Morero's method).

The Mooney viscosity of a polymer was measured at 100° C. using a tester of the RLM-01 type manufactured by TOYO SEIKI SEISAKUSHO Co., Ltd.

To find whether macrogel was present or absent, a 0.2 w/v % solution of a polymer was prepared using tetrahydrofuran as the solvent, and the presence or the absence of macrogel was examined by visual observation after the solution was left standing at the room temperature without being stirred for 24 hours.

<<Mooney Viscosity of a Rubber Composition>>

The Mooney viscosity [$ML_{1+4}$/130° C.] was measured at 130° C. in accordance with the method of Japanese Industrial Standard K6300-1994.

<<Physical Properties of a Vulcanized Rubber>>

(1) Low Heat Buildup Property

Using an apparatus for measuring viscoelasticity (manufactured by RHEOMETRICS Company), tan δ (50° C.) was measured at a temperature of 50° C., a strain of 5% and a frequency of 15 Hz. The smaller the value of tan δ, the smaller the heat buildup.

(2) Fracture Property (Tensile Strength)

The strength at break ($T_b$) was measured by a tensile tester in accordance with the method of Japanese Industrial Standard K6301-1995.

(3) Abrasion Resistance

The amount of abrasion was measured at the room temperature under a slipping ratio of 60% using a Lambourn abrasion tester. The result is expressed as an index of the abrasion resistance using the abrasion resistance of the control as the reference which is set at 100. The greater the index, the better the abrasion resistance.

<Preparation of a Catalyst>

Into a glass bottle having a volume of 100 ml and fitted with a rubber cap, which had been dried and purged with nitrogen, 7.11 g of a cyclohexane solution (15.2% by weight) of butadiene, 0.59 ml of a cyclohexane solution (0.56 M) of neodymium decanoate, 10.32 ml of a toluene solution (3.23 M as the concentration of aluminum) of methylaluminoxane MAO (manufactured by TOSO AKZO Co., Ltd; PMAO) and 7.77 ml of a hexane solution (0.90 M) of diisobutylaluminum hydride (manufactured by KANTO KAGAKU Co., Ltd.)

were placed successively in this order, and the resultant mixture was aged at the room temperature for 2 minutes. Then, 1.45 ml of a hexane solution (0.95 M) of diethylaluminum chloride (manufactured by KANTO KAGAKU Co., Ltd.) was added, and the resultant mixture was aged at the room temperature for 15 minutes under intermittent stirring. The concentration of neodymium in the catalyst solution thus obtained was 0.011 M (mole/liter).

Preparation Examples 1 to 4

Polymers E to H

<Preparation of a Polymer Intermediate>
Into a glass bottle having a volume of about 900 ml and fitted with a rubber cap, which had been dried and purged with nitrogen, a cyclohexane solution of dried and purified butadiene and dry cyclohexane were placed so that the glass bottle contained 400 g of a cyclohexane solution containing 12.5% by weight of butadiene. Then, 2.28 ml of the catalyst solution prepared above (containing 0.025 mmole of neodymium) was added, and the polymerization was conducted in a water bath at 50° C. for 1.0 hour.
<First Modification>
A silane compound of the type shown in Table 1 was added as a hexane solution (1.0 M) in an amount shown in Table 1 as the agent for the first modification, and the resultant mixture was treated at 50° C. for 60 minutes.
<Treatments after the First Modification>
To the mixture obtained above, 1.2 ml of an ester of a polyhydric alcohol with a carboxylic acid (manufactured by KANTO KAGAKU Co., Ltd.) shown in Table 1 was added, and the modification was conducted at 50° C. for 1 hour. The reaction was terminated by adding 2 ml of a 5% isopropanol solution of an antioxidant 2,2'-methylenebis(4-ethyl-6-t-butylphenol) (NS-5) to the polymerization system, and a polymer was obtained after reprecipitation with isopropanol containing a small amount of NS-5 and drying using a drum. Polymers E to H were obtained in this manner. The results of the analysis of the obtained polymers are shown in Table 1.

Preparation Example 5 to 7 and 12

Polymers I to K and P

After the polymerization of 1,3-butadiene was completed in accordance with the same procedures as those conducted in Preparation Example 1, the modification was conducted as described in the following.
<First Modification>
A silane compound of the type shown in Table 1 was added as a hexane solution (1.0 M) in an amount shown in Table 1 as the agent for the first modification, and the first modification was conducted by treating the resultant mixture at 50° C. for 60 minutes.
<Treatments after the First Modification>
To the mixture obtained above, 1.76 ml (corresponding to 70.5 eq/Nd) of a cyclohexane solution (1.01 M) of tin bis(2-ethylhexanoate) as the agent for condensation accelerator and 32 μl (corresponding to 70.5 eq/Nd) of ion-exchanged water were added, and the resultant mixture was treated in a water bath at 50° C. for 1.0 hour. Thereafter, the same procedures as those conducted in Preparation Example 1 were conducted. Polymers I to K and P were obtained in this manner. The results of the analysis of the obtained polymers are shown in Table 1.

Preparation Example 8 to 11

Polymers L to O

After the polymerization of 1,3-butadiene was completed in accordance with the same procedures as those conducted in Preparation Example 1, the modification was conducted as described in the following.
<First Modification>
A silane compound of the type shown in Table 1 was added as a hexane solution (1.0 M) in an amount shown in Table 1 as the agent for the first modification, and the reaction of the first stage was conducted by treating the resultant mixture at 50° C. for 30 minutes.
<Treatments after the First Modification>
To the mixture obtained above, a silane compound of the type shown in Table 1 (the agent for the second modification) was added as a hexane solution (1.0 M) in an amount shown in Table 1, and the resultant mixture was stirred at 50° C. for 30 minutes. Then, 1.76 ml (corresponding to 70.5 eq/Nd) of a cyclohexane solution of tin bis(2-ethylhexanoate) as the agent for condensation accelerator and 32 μl (corresponding to 70.55 eq/Nd) of ion-exchanged water were added, and the resultant mixture was treated in a water bath at 50° C. for 1 hour. Thereafter, the same procedures as those conducted in Preparation Example 1 were conducted. Polymers L to O were obtained in this manner. The results of the analysis of the obtained polymers are shown in Table 1.

Preparation Example 13

Polymer Q

Polymer Q was obtained in accordance with the same procedures as those conducted in Preparation Example 8 except that titanium tetrakis(2-ethylhexyloxide) was used in place of tin bis(2-ethylhexanoate). The results of the analysis of the obtained polymer are shown in Table 1.

Comparative Preparation Example 1

Polymer a without Modification

Polymer A was obtained in accordance with the same procedures as those conducted in Preparation Example 1 except that 1.83 ml of the catalyst solution was added, none of the first modification and the second modification was conducted after the polymer intermediate was prepared, and the reaction was terminated by adding 2 ml of a 5% isopropanol solution of an antioxidant (NS-5). The microstructure of the obtained polymer was as follows: the content of the cis-unit: 95.5%; the content of the trans-unit: 3.9; and the content of the vinyl unit: 0.6%. The results of the analysis of the obtained polymers are shown in Table 1.

Comparative Preparation Examples 2 to 4

Polymers B to D with Single Stage Modification

Polymers B to D were obtained in accordance with the same procedures as those conducted in Preparation Example 1 except that the first modification alone was conducted and the second modification was not conducted. The results of the analysis of the obtained polymers are shown in Table 1.

TABLE 1

| | Comparative Preparation Example | | | |
|---|---|---|---|---|
| Preparation Example | 1 | 2 | 3 | 4 |
| Polymer (in Preparation Example or Comparative Preparation Example) | A | B | C | D |
| mode of modification | none | first alone | first alone | first alone |
| Agent for the first modification (hydrocarbyloxysilane compound) | | | | |
| type | — | GPMOS | TEOSIPDI | GPMOS + TEOSIPDI |
| amount * | 0 | (23.5) | (23.5) | (23.5 + 23.5) |
| Agent for the second modification (added after the first modification) (hydrocarbyloxysilane compound) | | | | |
| type | — | — | — | — |
| amount * | — | — | — | — |
| Condensation accelerator | — | — | — | — |
| Partial ester of polyhydric alcohol with carboxylic acid | — | — | — | — |
| Evaluation | | | | |
| macrogel | none | great amount | great amount | great amount |
| Mooney viscosity ($ML_{1+4}$, 100° C.) | 37 | 92 | 45 | 42 |

| | Comparative Preparation Example | | | |
|---|---|---|---|---|
| Preparation Example | 1 | 2 | 3 | 4 |
| Polymer (in Preparation Example or Comparative Preparation Example) | E | F | G | H |
| mode of modification | (1) | (1) | (1) | (1) |
| Agent for the first modification (hydrocarbyloxysilane compound) | | | | |
| type | GPMOS | TEOSIPDI | GPMOS + TEOSIPDI | GPMOS |
| amount * | (23.5) | (23.5) | (23.5 + 23.5) | (23.5) |
| Agent for the second modification (added after the first modification) (hydrocarbyloxysilane compound) | | | | |
| type | — | — | — | — |
| amount * | — | — | — | — |
| Condensation accelerator | — | — | — | — |
| Partial ester of polyhydric alcohol with carboxylic acid | STO | STO | STO | SML |
| Evaluation | | | | |
| macrogel | none | none | none | none |
| Mooney viscosity ($ML_{1+4}$, 100° C.) | 59 | 45 | 36 | 56 |

| | Preparation Comparative Example | | |
|---|---|---|---|
| Preparation Example | 5 | 6 | 7 |
| Polymer (in Preparation Example or Comparative Preparation Example) | I | J | K |

TABLE 1-continued

| mode of modification | (2-2) | (2-2) | (2-2) |
|---|---|---|---|
| Agent for the first modification (hydrocarbyloxysilane compound) | | | |
| type | GPMOS | TEOSIPDI | GPMOS + TEOSIPDI |
| amount * | (23.5) | (23.5) | (23.5 + 23.5) |
| Agent for the second modification (added after the first modification) (hydrocarbyloxysilane compound) | | | |
| type | — | — | — |
| amount * | — | — | — |
| Condensation accelerator | BEHAS/$H_2O$ | BEHAS/$H_2O$ | BEHAS/$H_2O$ |
| Partial ester of polyhydric alcohol with carboxylic acid | — | — | — |
| Evaluation | | | |
| macrogel | none | none | none |
| Mooney viscosity ($ML_{1+4}$, 100° C.) | 93 | 54 | 53 |

| | Preparation Comparative Example | | | |
|---|---|---|---|---|
| Preparation Example | 8 | 9 | 10 | 11 |
| Polymer (in Preparation Example or Comparative Preparation Example) | L | M | N | O |
| mode of modification | (2-1) | (2-1) | (2-1) | (2-1) |
| Agent for the first modification (hydrocarbyloxysilane compound) | | | | |
| type | GPMOS | TEOSIPDI | GPMOS | GPMOS |
| amount * | (23.5) | (23.5) | (23.5) | (23.5) |
| Agent for the second modification (added after the first modification) (hydrocarbyloxysilane compound) | | | | |
| type | TEOSIPDI | GPMOS | APTEOS | MAPTEOS |
| amount * | (23.5) | (23.5) | (23.5) | (23.5) |
| Condensation accelerator | BEHAS/$H_2O$ | BEHAS/$H_2O$ | BEHAS/$H_2O$ | BEHAS/$H_2O$ |
| Partial ester of polyhydric alcohol with carboxylic acid | — | — | — | — |
| Evaluation | | | | |
| macrogel | none | none | none | none |
| Mooney viscosity ($ML_{1+4}$, 100° C.) | 54 | 51 | 66 | 58 |

| | Preparation Comparative Example | |
|---|---|---|
| Preparation Example | 12 | 13 |
| Polymer (in Preparation Example or Comparative Preparation Example) | P | Q |
| mode of modification | (2-2) | (2-1) |
| Agent for the first modification (hydrocarbyloxysilane compound) | | |
| type | GPMOS + DMAPTEOS | GPMOS |
| amount * | (23.5 + 23.5) | (23.5) |

TABLE 1-continued

| | | |
|---|---|---|
| Agent for the second modification (added after the first modification) (hydrocarbyloxysilane compound) | | |
| type | — | TEOSIPDI |
| amount * | — | (23.5) |
| Condensation accelerator | BEHAS/H₂O | TEHO/H₂O |
| Partial ester of polyhydric alcohol with carboxylic acid | | |
| Evaluation | — | — |
| macrogel | none | none |
| Mooney viscosity (ML$_{1+4}$, 100° C.) | 53 | 89 |

Notes
* The number in the parenthesis shows the amount of the added hydrocarbyloxysilane compound (mole equivalent based on the amount of neodymium)
GPMOS: 3-Glycidoxypropyltrimethoxysilane (epoxy)
TEOSIPDL N-(3-Triethoxysilylpropyl)-4,5-dihydroimidazole (amidine (imine))
DMAPTEOS: 3-Dimethylaminopropyl(triethoxy)silane (imine)
STO: Sorbitan trioleate (sugar ester)
SML: Sorbitan monolaurate (sugar ester)
APTEOS: 3-Aminopropyltriethoxysilane (primary amine)
MAPTEOS: 3-(N-Methylamino)propyltriethoxysilane (secondary amine)
BEHAS: Tin bis(2-ethyl hexanoate)
TEHO: Titanium tetrakis(2-ethylhexyloxide)

Examples 1 to 13 and Comparative Example 1 to 4

Using polymers A to Q obtained above, rubber compositions containing silica (Formulation 1) and rubber compositions containing carbon black (Formulation 2) were prepared. Formulations 1 and 2 are shown in Table 2.

TABLE 2

| Components of formulation (part by weight) | Formulation 1 | Formulation 2 |
|---|---|---|
| First stage | | |
| polymer obtained in Preparation Example | 70 | 70 |
| natural rubber | 30 | 30 |
| carbon black | 0 | 50 |
| silica | 55 | 0 |
| aromatic oil | 10 | 10 |
| stearic acid | 2 | 2 |
| coupling agent | 5.5 | 0 |
| antioxidant 6C | 1 | 1 |
| Second stage | | |
| ZnO | 3 | 3 |
| vulcanization accelerator DPG | 1 | 0.5 |
| vulcanization accelerator DM | 1 | 0.5 |
| vulcanization accelerator | 1 | 0.5 |
| sulfur | 1.5 | 1.5 |

Silica: Manufactured by Nippon Silica Kogyo Co., Ltd.; the trade name: NIPSIL AQ
Carbon black: Manufactured by TOKAI CARBON Co., Ltd.; the trade name: SIEST KH (N339)
Coupling agent: Manufactured by DEGUSSA Company; a silane coupling agent; the trade name: Si69; bis(3-triethoxysilylpropyl) tetrasulfide
6C: N-(1,3-Dimethylbutyl)-N'-phenyl-p-phenylenediamine
DPG: Diphenylguanidine
DM: Mercaptobenzothiazyl disulfide
NS: N-t-Butyl-2-benzothiazylsulfenamide The Mooney viscosity (130° C.) of the above rubber compositions before the vulcanization was measured. The rubber compositions were vulcanized in the condition of 160° C. for 15 minutes, and the low heat buildup property, the fracture property (the tensile strength) and the abrasion resistance of the vulcanized rubber were evaluated. The results of the evaluation are shown in Table 3.

TABLE 3

| | Example | | | | Comparative Example | | | |
|---|---|---|---|---|---|---|---|---|
| Example | 1 | 2 | 3 | 4 | 1 | 2 | 3 | 4 |
| Polymer Formulation 1 (rubber composition containing silica) | A | B | C | D | E | F | G | H |
| Mooney viscosity (ML$_{1+4}$, 130° C.) | 70 | 104 | 68 | 77 | 89 | 65 | 75 | 84 |
| tensile strength Tb (MPa) | 21.0 | 20.0 | 19.3 | 19.6 | 20.2 | 19.7 | 19.7 | 19.1 |

TABLE 3-continued

|  |  |  |  |  |  |  |  |  |
|---|---|---|---|---|---|---|---|---|
| low heat buildup tan δ (10%, 50° C.) | 0.141 | 0.106 | 0.116 | 0.095 | 0.090 | 0.117 | 0.136 | 0.085 |
| abrasion resistance (index) | 100 | 103 | 107 | 106 | 110 | 108 | 111 | 111 |
| Formulation 2 (rubber composition containing carbon black) | | | | | | | | |
| Mooney viscosity (ML$_{1+4}$, 100° C.) | 60 | — | 63 | — | — | 59 | — | 61 |
| tensile strength Tb (MPa) | 21.8 | — | 20.2 | — | — | 20.9 | — | — |
| low heat buildup tan δ (10%, 50° C.) | 0.160 | — | 0.145 | — | — | 0.134 | — | — |
| abrasion resistance (index) | 100 | — | 104 | — | — | 109 | — | 111 |

| Example | | | | Comparative Example | | | | | |
|---|---|---|---|---|---|---|---|---|---|
| Example | 5 | 6 | 7 | 8 | 9 | 10 | 11 | 12 | 13 |
| Polymer | I | J | K | L | M | N | O | P | Q |
| Formulation 1 (rubber composition containing silica) | | | | | | | | | |
| Mooney viscosity (ML$_{1+4}$, 130° C.) | 104 | 77 | 86 | 88 | 81 | 94 | 91 | 88 | 97 |
| tensile strength Tb (MPa) | 19.5 | 19.6 | 18.4 | 19.6 | 18.6 | 20.1 | 19.6 | 19.7 | 19.0 |
| low heat buildup tan δ (10%, 50° C.) | 0.079 | 0.092 | 0.073 | 0.071 | 0.082 | 0.070 | 0.072 | 0.085 | 0.088 |
| abrasion resistance (index) | 111 | 110 | 109 | 110 | 109 | 114 | 113 | 111 | 108 |
| Formulation 2 (rubber composition containing carbon black) | | | | | | | | | |
| Mooney viscosity (ML$_{1+4}$, 100° C.) | — | 64 | — | 69 | — | 72 | 69 | 66 | 72 |
| tensile strength Tb (MPa) | — | 21.2 | — | 21.6 | — | 22.1 | 21.9 | 21.5 | 21.3 |
| low heat buildup tan δ (10%, 50° C.) | — | 0.117 | — | 0.104 | — | 0.099 | 0.109 | 0.118 | 0.110 |
| abrasion resistance (index) | — | 111 | — | 115 | — | 119 | 114 | 110 | 113 |

The results in Table 1 show that the polymers prepared in accordance with the conventional process having the first modification alone (polymers B to D) contained a great amount of macrogel and, in contrast, the polymers prepared in accordance with the process of the present invention (polymers E to Q) contained no macrogel. The results in Table 3 show that the rubber compositions using the modified polymers of the present invention (Examples 1 to 13) suppressed the increase in the Mooney viscosity and remarkably improved the low heat buildup property and the abrasion resistance without adverse effects on the fracture property (the tensile strength) in both cases of the silica-based formulation and the carbon black-based formulation.

INDUSTRIAL APPLICABILITY

In accordance with the present invention, since the problem of macrogel formed in the finishing step of a polymer after the removal of the solvent and the drying can be overcome, an excessive increase in the Mooney viscosity of the polymer is suppressed, and the workability of the rubber composition in the unvulcanized condition can be remarkably improved. In both cases of the silica-based formulation and the carbon black-based formulation, the interaction with silica or carbon black can be enhanced, and the fracture property, the abrasion resistance and the low heat buildup property of the vulcanized rubber can be simultaneously improved. Therefore, the polymer can be applied to rubber compositions for tires. Moreover, the resistance to cold flow of the diene-based polymer can be improved.

The invention claimed is:

1. A process for producing a conjugated diene-based polymer which comprises conducting a first modification of a conjugated diene-based polymer having active chain ends, which is obtained by polymerizing a diene-based monomer singly or in combination with other monomers and has a content of a cis-1,4 unit of 75% by mole or greater in a conjugated diene portion of a main chain, by bringing the active chain ends into reaction with a hydrocarbyloxysilane compound, and conducting a second modification of a polymer obtained by the first modification by adding a hydrocarbyloxysilane compound in a presence of a condensation accelerator, wherein at least one of hydrocarbyloxysilane compounds represented by general formula (I) and partial condensation products thereof is used as the hydrocarbyloxysilane compound in the first modification, general formula (I) being:

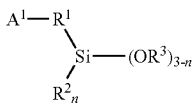

wherein $A^1$ represents a monovalent group having at least one functional group selected from (thio)epoxy group, (thio)isocyanate group, (thio)ketone group, (thio)aldehyde group, imine group, amide group, trihydrocarbyl ester group of isocyanuric acid, (thio)carboxylic acid ester groups, alkali metal salts and alkaline earth metal salts of (thio)carboxylic acid ester groups, carboxylic acid anhydride groups, carboxylic acid halide groups and dihydrocarbyl ester groups of carbonic acid; $R^1$ represents a single bond or a divalent inert hydrocarbon group, $R^2$ and $R^3$ each independently represent a monovalent aliphatic hydrocarbon group having 1 to 20 carbon atoms or a monovalent aromatic hydrocarbon group having 6 to 18 carbon atoms; n represents an integer of 0 to 2; a plurality of $OR^3$ may represent a same group or different groups when the plurality of $OR^3$ are present; and no active protons or onium salts are present in a molecule, and wherein, after the first modification is conducted by bringing the active chain ends into reaction with the hydrocarbyloxysilane compound represented by general formula (I) (hydrocarbyloxysilane compound I), at least one compound (hydrocarbyloxysilane compound II) selected from hydrocarbyloxysilane compounds represented by general formula (II) and/or partial condensation products thereof and hydrocarbyloxysilane compounds represented by general formula (III) and/or partial condensation products thereof and a condensation accelerator are added and brought into reaction with the polymer obtained by the first modification, general formula (II) being:

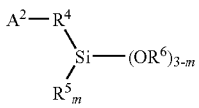

wherein $A^2$ represents a monovalent group having at least one functional group selected from cyclic tertiary amine groups, acyclic tertiary amine groups, pyridine groups, sulfide groups, polysulfide groups and nitrile groups; $R^4$ represents a single bond or a divalent inert hydrocarbon group, $R^5$ and $R^6$ each independently represent a monovalent aliphatic hydrocarbon group having 1 to 20 carbon atoms or a monovalent aromatic group having 6 to 18 carbon atoms; m represents an integer of 0 to 2; a plurality of $OR^6$ may represent a same group or different groups when the plurality of $OR^6$ are present; and no active protons or onium salts are present in a molecule, and general formula (III) being:

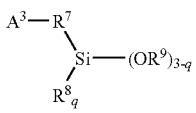

wherein $A^3$ represents a monovalent group having at least one functional group selected from alcohol groups, thiol groups, primary amine groups, onium salts thereof, cyclic secondary amine groups, onium salts thereof, acyclic amine groups, onium salts thereof, onium salts of cyclic tertiary amine groups, onium salts of acyclic tertiary amine groups, groups having allyl group or benzyl-Sn bond, sulfonyl group, sulfinyl group and nitrile group; $R^7$ represents a single bond or a divalent inert hydrocarbon group, $R^8$ and $R^9$ each independently represent a monovalent aliphatic hydrocarbon group having 1 to 20 carbon atoms or a monovalent aromatic group having 6 to 18 carbon atoms; q represents an integer of 0 to 2; a plurality of $OR^9$ may represent a same group or different groups when the plurality of $OR^9$ are present.

2. A process for producing a conjugated diene-based polymer according to claim 1, wherein the condensation accelerator comprises at least one compound selected from a group consisting of metal compounds shown in (1) to (3) and water, (1) to (3) being:

(1) Salts of tin having an oxidation number of 2 with carboxylic acids having 3 to 30 carbon atoms represented by a following general formula:

wherein $R^{10}$ represents an organic group having 2 to 19 carbon atoms, and a plurality of $R^{10}$ may represent a same group or different groups when the plurality of $R^{10}$ are present;

(2) Compounds of tin having an oxidation number of 4 and represented by a following general formula:

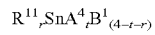

wherein r represents an integer of 1 to 3, t represents an integer of 1 or 2 and t+r represents an integer of 3 or 4; $R^{11}$ represents an aliphatic hydrocarbon group having 1 to 30 carbon atoms; $B^1$ represents hydroxyl group or a halogen atom; and $A^4$ represents a group selected from (a) carboxyl groups having 2 to 30 carbon atoms, (b) $\alpha,\gamma$-dionyl groups having 5 to 30 carbon atoms, (c) hydrocarbyloxyl groups having 3 to 30 carbon atoms and (d) siloxyl groups having three substituents which are selected from hydrocarbyl groups having 1 to 20 carbon atoms and hydrocarbyloxyl groups having 1 to 20 carbon atoms, the three substituents being same with or different from each other, and a plurality of $A^4$ may represent a same group or different groups when the plurality of $A^4$ are present; and (3) Compounds of titanium having an oxidation number of 4 and represented by a following general formula:

wherein x represents an integer of 2 or 4; $A^5$ represents (a) a hydrocarbyloxyl group having 3 to 30 carbon atoms or (b) a siloxyl group having three substituents which are selected from alkyl groups having 1 to 30 carbon atoms and hydrocarbyloxyl groups having 1 to 20 carbon atoms, and a plurality of $A^5$ may represent a same group or different groups when the plurality of $A^5$ are present; and $B^2$ represents an $\alpha,\gamma$-dionyl group having 5 to 30 carbon atoms.

3. A process for producing a conjugated diene-based polymer according to claim 1, wherein a polymerization catalyst used for the polymerization to obtain the conjugated diene-based polymer having active chain ends comprises a combination of at least one compound selected from each of elements shown in (A), (B) and (C):

(A) Rare earth compounds selected from following (A1) to (A4), which may be directly used as a solution in an inert organic solvent or in a form supported with an inert solid,
- (A1) Compounds of rare earth elements having an oxidation number of 3 and having three ligands selected from carboxyl groups having 2 to 30 carbon atoms, alkoxyl groups having 2 to 30 carbon atoms, aryloxy groups having 6 to 30 carbon atoms and α,γ-diketonyl groups having 5 to 30 carbon atoms and complex compounds of these compounds with Lewis base compounds;
- (A2) Complex compounds of trihalides of rare earth elements with Lewis acids;
- (A3) Organic compounds of rare earth elements having an oxidation number of 3 in which at least one (substituted) allyl group is directly bonded to a rare earth atom; and
- (A4) Organic compounds of rare earth elements having an oxidation number of 2 or 3 and having at least one (substituted) cyclopentadienyl group directly bonded to a rare earth atom and reaction products of the organic rare earth compounds and trialkylaluminums or ionic compounds comprising a non-coordinating anion and a counter cation;

(B) Organoaluminum compounds selected from compounds shown in (B1) to (B3):
- (B1) Trihydrocarbylaluminum compounds represented by a formula $R^{12}{}_3Al$, wherein $R^{12}$ represents a hydrocarbon group having 1 to 30 carbon atoms and may represent a same group or different groups;
- (B2) Hydrocarbylaluminum hydride represented by a formula $R^{13}{}_2AlH$ or $R^{13}AlH_2$, wherein $R^{13}$ represents a hydrocarbon group having 1 to 30 carbon atoms, and a plurality of $R^{13}$ may represent a same group or different groups when the plurality of $R^{13}$ are present; and
- (B3) Hydrocarbylaluminoxane compound having hydrocarbon groups having 1 to 20 carbon atoms; and (C) Compounds selected from compounds shown in (C1) to (C4):
- (C1) Inorganic and organic compounds of elements of Groups II, III and IV having at least one hydrolyzable halogen atom and complex compounds thereof with Lewis bases;
- (C2) Organic halogen compounds having at least one structure selected from tertiary alkyl halides, benzyl halides and allyl halides;
- (C3) Zinc halides and complex compounds thereof with Lewis acids; and
- (C4) Ionic compounds comprising a non-coordinating anion and a counter cation;

the element shown in (C) being not essential when element (A) comprises a halogen or a non-coordinating anion or element (B) comprises an aluminoxane.

4. A process for producing a conjugated diene-based polymer according to claim 3, wherein the rare earth element is at least one element selected from a group consisting of lanthanum, neodymium, praseodymium, samarium and gadolinium.

5. A process for producing a conjugated diene-based polymer according to claim 1, wherein the conjugated diene-based polymer is at least one polymer selected from the group consisting of polybutadiene, polyisoprene and copolymers of butadiene with other conjugated dienes.

\* \* \* \* \*